(12) United States Patent
Hayabuchi et al.

(10) Patent No.: US 6,743,148 B2
(45) Date of Patent: Jun. 1, 2004

(54) PLANETARY GEAR SET

(75) Inventors: Masahiro Hayabuchi, Anjo (JP); Masaaki Nishida, Anjo (JP); Satoru Kasuya, Anjo (JP); Hiroshi Katou, Anjo (JP); Yukio Hiramoto, Anjo (JP); Tomohisa Miyamoto, Anjo (JP); Tatsuya Iida, Takefu (JP); Masahiro Yamaguchi, Takefu (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/168,503

(22) PCT Filed: Oct. 23, 2001

(86) PCT No.: PCT/JP01/09268

§ 371 (c)(1),
(2), (4) Date: Aug. 12, 2002

(87) PCT Pub. No.: WO02/35116

PCT Pub. Date: May 2, 2002

(65) Prior Publication Data

US 2003/0100399 A1 May 29, 2003

(30) Foreign Application Priority Data

Oct. 23, 2000 (JP) .................................... 2000-323385
Oct. 23, 2000 (JP) .................................... 2000-323386

(51) Int. Cl.$^7$ ............................................... F16H 57/08
(52) U.S. Cl. ...................... 475/331; 475/340; 475/338
(58) Field of Search ................................ 475/344, 331, 475/340, 338, 319, 313, 325

(56) References Cited

U.S. PATENT DOCUMENTS

| 3,527,121 | A | | 9/1970 | Moore | |
|---|---|---|---|---|---|
| 3,780,601 | A | | 12/1973 | Dach et al. | |
| 3,939,736 | A | * | 2/1976 | Morin | 475/338 |
| 4,617,839 | A | * | 10/1986 | Matoba | 475/335 |
| 4,793,214 | A | * | 12/1988 | Nurnberger et al. | 475/331 |
| 4,901,602 | A | * | 2/1990 | Matoba | 475/335 |
| 5,509,865 | A | * | 4/1996 | Hall, III | 475/340 |
| 6,422,971 | B1 | * | 7/2002 | Katou et al. | 475/331 |

FOREIGN PATENT DOCUMENTS

| JP | Y2 1-42687 | 12/1989 |
|---|---|---|
| JP | A 7-133848 | 5/1995 |
| JP | Y2 7-52997 | 12/1995 |
| JP | A 8-128518 | 5/1996 |
| JP | A 10-169728 | 6/1998 |
| JP | A 11-159614 | 6/1999 |
| JP | A 2000-46159 | 2/2000 |

* cited by examiner

*Primary Examiner*—Tisha D Lewis
(74) *Attorney, Agent, or Firm*—Oliff & Berridge, PLC

(57) ABSTRACT

A planetary gear set including a plurality of pinions meshing with a sun gear and a carrier C that shaft-supports the pinions. The carrier has an annular peripheral wall that extends entirely around outer peripheries of the plurality of pinions. Thin-wall portions receded at a radially inner side are formed in the annular peripheral wall, at circumferential-direction positions corresponding to the positions of the pinions.

14 Claims, 5 Drawing Sheets

PLANETARY GEAR SET

BACKGROUND OF THE INVENTION

1. Field of Invention

The invention relates to a planetary gear set for use in a transmission apparatus, such as an automatic transmission and the like, and, more particularly, to a carrier structure of a planetary gear set of a Ravigneaux type, a double-pinion type, or the like, having pairs of pinion gears that mesh with each other.

2. Description of Related Art

In typical transmission apparatuses, such as automatic transmissions and the like, a planetary gear set that forms a speed change mechanism is disposed around an input shaft of the transmission apparatus, an output shaft thereof, or an intermediate shaft connected to the input shaft and the output shaft, or around an axis of these shafts if the shafts are coaxially disposed. Friction members of clutches, brakes and the like for controlling the engagement and disengagement of a sun gear, a carrier and a ring gear provided as speed-changing elements with respect to an input or output member or a case are less, subject to constraints in a mount position. Therefore, the friction members are disposed between or around the planetary gear set due to an apparatus layout relationship. The brake friction members, in particular, are often disposed at an outer periphery of the planetary gear set because an outer peripheral side thereof is supported to the case of the transmission apparatus.

An inside diameter of the sun gear as a component element of the planetary gear set disposed around the aforementioned shaft, whose shaft diameter is determined in accordance with a transfer torque capacity, is restricted by the outside diameter of the shaft due to the aforementioned placement relationship. Therefore, if the apparatus is designed for higher torque, the inside diameter of the sun gear is increased, and therefore, the outside diameter of the entire planetary gear set correspondingly increases. Therefore, if friction members of friction engagement elements are disposed at an outer periphery of the planetary gear set, the outside diameter of the mechanism including the friction members becomes even greater. As a result, the placement becomes very difficult in apparatuses whose outside diameter dimensions are restricted, such as automatic transmissions installed in vehicles.

In a high torque-transferring planetary gear set, it is advantageous to increase the number of pinions in order to reduce the torque load on each pinion from the viewpoint of securing durability. However, as the number of pinions is increased, it becomes more difficult to provide a rigid carrier that supports the pinions. Obtaining a rigid carrier is even more difficult because the carrier, supporting the pinions via shafts, receives torsional moments caused by reaction forces based on the intermeshing. If the rigidity of the carrier is reduced due to the aforementioned circumstances, the carrier causes an improper gear mesh due to its deformation, thus giving rise to problems of reduction in durability, occurrence of gear noises, etc.

In the case of an ordinary simple planetary gear, the number of pinions is small (normally, three to five), and the support span of the carrier supporting the pinion is also short, so that it is relatively easy to provide a rigid planetary carrier against the aforementioned torsional force. However, if the number of pinions (normally, six to ten in three to five sets) is small as in the case of a double-pinion type planetary gear, the inter-gear space for inserting bridge members that bridge two opposite end walls of the carrier in the direction of an axis thereof is considerably restricted. If the axis length of the pinions is great as in the case of a Ravigneaux-type planetary gear, the axis length of the bridge members becomes great, so that it becomes even more difficult to provide a sectional area of the members that is sufficient to secure torsional rigidity.

With regard to a planetary carrier that supports pairs of pinion gears, a conventional technology that is considered effective to secure rigidity of the carrier is disclosed in Japanese Patent No. 2852816. This technology adopts a carrier structure in which a cup-shaped first support member is connected by welding in a two-story fashion to a cup-shaped second support member having an outer peripheral flange portion. A base wall of the first support member serves as a support portion for the two types of pinions, and a base portion of the second support member serves as another support portion for the short pinions. A peripheral wall of the second support member is partially cut and raised inwardly so as to form another support portion for the long pinions. A peripheral wall of the first support member is partially cut away to expose outer peripheries of the long pinions to an outer peripheral side of the carrier for the purpose of meshing with the ring gear.

The conventional-art Ravigneaux-type planetary carrier has a structure in which the two cup-shaped support members are connected and the carrier as a whole has a box shape, and therefore is considered effective to secure rigidity. However, the long pinion-supporting portion is a tongue-like portion formed by cutting up a peripheral wall portion. Therefore, due to this structure, the tongue-like portion has a cantilever structure in which the portion is supported only at an end side thereof by the flange portion Hence, it is assumed that the rigidity for the long pinion support is low, and it can be said that the above-described structure is not altogether suitable to a high-capacity planetary gear set.

Furthermore, the structure in which the long pinions are exposed by cutting out a portion of the peripheral wall of the cup-shaped member so as to secure a mesh can be adopted in a case where the pinion diameter is small. However, if this structure is adopted in a case where the pinion diameter is increased in order to secure a capacity and a durability of the planetary gear set that are suitable for a high-output and high-speed design, it becomes necessary to reduce the sun gear diameter. Thus, a suitable gear ratio setting becomes difficult. If a gear ratio setting is made so as to avoid a reduction of the sun gear diameter, the outside diameter of the carrier becomes great, so that the entire size of the planetary gear set becomes large. Thus, weight and size reductions will be impeded.

SUMMARY OF THE INVENTION

The invention thus provides a planetary gear set that makes it possible to dispose many pinions whose outside diameter is larger relative to the sun gear diameter while providing a rigid carrier. The invention also provides a carrier structure that, in an arrangement where friction members, such as clutches, brakes, etc., are disposed at an outer peripheral side of a planetary gear set, prevents an increase in the radial dimension of the apparatus while providing transfer torque capacities of the planetary gear set and the friction members. The invention also improves the rigidity of a carrier of a planetary gear set that supports a combination of pairs of pinion gears, and to thereby provide a planetary carrier that allows an arrangement of an increased number of pinion gear pairs and improves the durability of the planetary gear.

In order to achieve the foregoing, the invention is a planetary gear set with a plurality of pinions meshing with a sun gear and a carrier that shaft-supports the pinions, wherein the carrier has an annular peripheral wall that extends entirely around outer peripheries of the plurality of pinions, wherein the annular peripheral wall has thin-wall portions formed by recesses in a radially inner side at a circumferential-direction position corresponding to a position of the pinions.

This construction makes it possible to obtain a planetary gear set in which many pinions, whose pinion diameters are great relatively to the sun gear diameter, are disposed with an annular peripheral wall sufficient to maintain a rigidity of the carrier. Furthermore, because it becomes possible to provide an arrangement of many pinions which does not degrade the rigidity of the carrier, the torque load per pinion can be reduced, and therefore, the durability of the planetary gear set can be improved.

In the foregoing construction, the annular peripheral wall has, on an outer periphery thereof, a spline for supporting a friction member in a rotation stopping fashion, and teeth of the spline are absent in the thin-wall portions, and an outside diameter at the thin-wall portions is equal to an outside diameter at the teeth of the spline.

If a friction engagement element, such as a clutch, a brake, or the like, is disposed at the outer peripheral side of the planetary gear set, the above-described construction makes it possible to adopt an arrangement in which the spline teeth for supporting the friction member of the friction engagement element and the outside diameter of a pinion outwardly touch or overlap each other. Therefore, it becomes possible to substantially avoid a diameter increase of a mechanism due to a radial-direction superposed arrangement of the planetary gear set and friction engagement elements. Therefore, under a restricted exterior dimensional condition, it becomes possible to expand the dimension of a friction member in a radially inward direction if a torque capacity of the friction engagement element is needed, and to select the increasing of the diameter of the planetary gear set including the carrier if a torque capacity of the planetary gear set is needed. Thus, the degree of freedom in setting a power transmission apparatus employing the planetary gear set.

In either one of the foregoing constructions, it is effective to adopt a construction in which the plurality of pinions are connected to other pinions that mesh with at least a ring gear.

This construction allows a size reduction of a transmission apparatus due to an arrangement in which friction engagement elements, such as clutches, brakes, etc., and the ring gear are disposed in the direction of an axis, at the outer peripheral side of the planetary gear set.

In any one of the foregoing constructions, it is possible to adopt an application in which the plurality of pinions and the other pinions are long pinions of a Ravigneaux type planetary gear set.

This construction makes it possible to effectively achieve the advantages corresponding to the foregoing constructions, with regard to Ravigneaux type planetary gear sets in which the number of pinions tends to be great.

In the foregoing construction, it is possible to adopt an application in which the long pinions are stepped pinions in which the plurality of pinions have a smaller diameter than the other pinions.

This construction further makes it easy to secure an installation space for the friction members of friction engagement elements, such as clutches, brakes, etc., disposed at the outer peripheral side of the planetary gear set.

Next, the invention is a planetary carrier which shaft-supports intermeshing gear pairs of a first pinion that meshes with only a sun gear, and a second pinion that meshes with at least a ring gear, wherein two end portions of the carrier that shaft-support one end and another end of each pinion are connected by a bridge portion that extends in a direction of an axis, the planetary carrier being characterized in that the bridge portion has a column wall portion that fills a space between a first pinion and a second pinion of adjacent gear pairs, and a plate wall portion that extends from the column wall portion in a direction of a circumference of the carrier, and within a space between the second pinions of the adjacent gear pairs, and outwardly of the first pinion.

In this construction, the bridge portion is formed by the column wall portion and the plate wall portion by utilizing wedge-shaped spaces between first pinions and second pinions of adjacent gear pairs, and arc-shaped spaces between adjacent second pinions. Therefore, the torsional strength can be enhanced, in comparison with a conventional bridge portion formed by only a plate wall portion. Hence, it becomes possible to improve the rigidity of the entire planetary carrier. Therefore, according to this construction, an increased number of gear pairs are disposed with respect to a fixed carrier outside diameter, so as to reduce the torque transfer load per gear pair. Thus, the durability of the planetary gear set can be improved.

Furthermore, the invention is a planetary carrier which shaft-supports intermeshing gear pairs of a first pinion that meshes with only a sun gear, and a second pinion that meshes with at least a ring gear, wherein two end portions of the carrier that shaft-support one end and another end of each pinion are connected by a bridge portion that extends in a direction of an axis, the planetary gear set being characterized in that the first pinion has a smaller diameter than the second pinion, and that the bridge portion is formed by a wall that extends in a direction of a circumference of the carrier, and within a space between the second pinions of adjacent gear pairs, and outwardly of the first pinion.

In this construction, the first pinions have a smaller diameter than the second pinions, and spaces are formed outward of the first pinions with the reduced diameter, and the bridge portions are disposed in the spaces. In this manner, it is possible to construct bridge portions that are long in the circumferential-direction length, which is similar to a single-pinion construction, and that fully use the spaces between adjacent second pinions. Therefore, the torsional strength can be increased, so that the rigidity of the entire planetary carrier can be improved. Furthermore, according to this construction, the aforementioned rigidity improvement is achieved by reducing the diameter of the first pinion of each gear pair, that is, the pinion meshing with only the sun gear. Therefore, it is possible to improve the rigidity of the planetary carrier without affecting the gear ratio determined by the gear diameter of the second pinions meshed with the ring gear.

In either one of the foregoing constructions, it is effective to adopt a construction in which a supporting axis of the first pinion is positioned inward of a supporting axis of the second pinion in the direction of the circumference of the carrier.

In this construction, the first pinions are positioned relatively radially inward of the second pinions, so that the bridge portion installation spaces outward of the first pinions can be enlarged in radial directions. Therefore, the thickness of the entire bridge portions can be increased.

This construction is applicable to a case where the gear pairs are long pinions and short pinions of a Ravigneaux type planetary gear set.

This construction is able to achieve the advantages corresponding to any of the above constructions, in a planetary carrier of a Ravigneaux type planetary gear set that tends to be long in an axis-direction length because long pinions are provided as component elements.

In the foregoing construction, in particular, it is effective to adopt a construction wherein the end wall that shaft-supports an end of each pinion is a box structure wall in which an end wall that shaft-supports an end of a short pinion and an end wall that shaft-supports an end of a long pinion are connected by an axis-direction wall that continuously extends in a circumferential direction, and wherein the bridge portion connects the end wall that shaft-supports the end of the short pinion and an end wall that shaft-supports another end of each pinion.

In this construction, the end wall that cannot be formed as an end wall continuously extending in a radial direction because of the end wall supporting the long pinions and the short pinions that are different in axial length is reinforced by the box structure. Therefore, the rigidity of the bridge portion is improved, and furthermore, the rigidity of the entire planetary carrier of a Ravigneaux type planetary gear set can be improved.

The foregoing constructions are also applicable if the gear pairs are pinions of a double-pinion type planetary gear set.

This construction is able to achieve the advantages corresponding to the foregoing constructions, in the planetary carrier of a double-pinion type planetary gear set.

BRIEF DESCRIPTION OF THE DRAWINGS

The foregoing and further objects, features and advantages of the invention would become apparent from the following description of preferred embodiments with reference to the accompanying drawings, wherein like numerals are used to represent light elements and wherein.

DETAILED DESCRIPTION OF PREFERRED EMBODIMENTS

Embodiments of the invention will next be described with reference to the drawings. FIGS. 1 to 4 show a first embodiment in which the invention is applied to a Ravigneaux type planetary gear set having four pairs of pinion gears.

Figure 1:
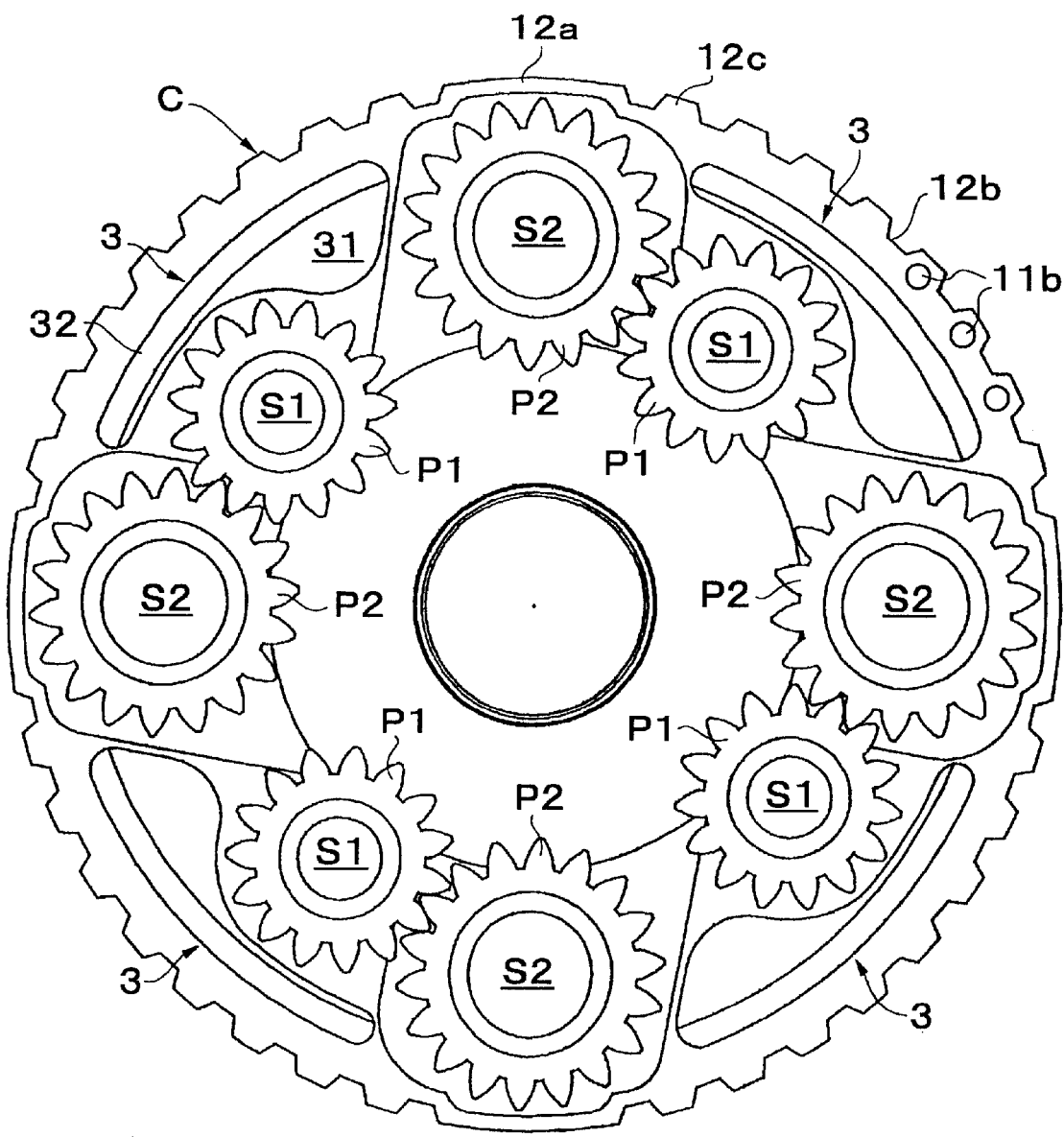
FIG. 1 is an elevational view of a carrier body of a planetary gear set in accordance with a first embodiment of the invention, wherein the carrier body is assembled with gears.
Figure 2A:
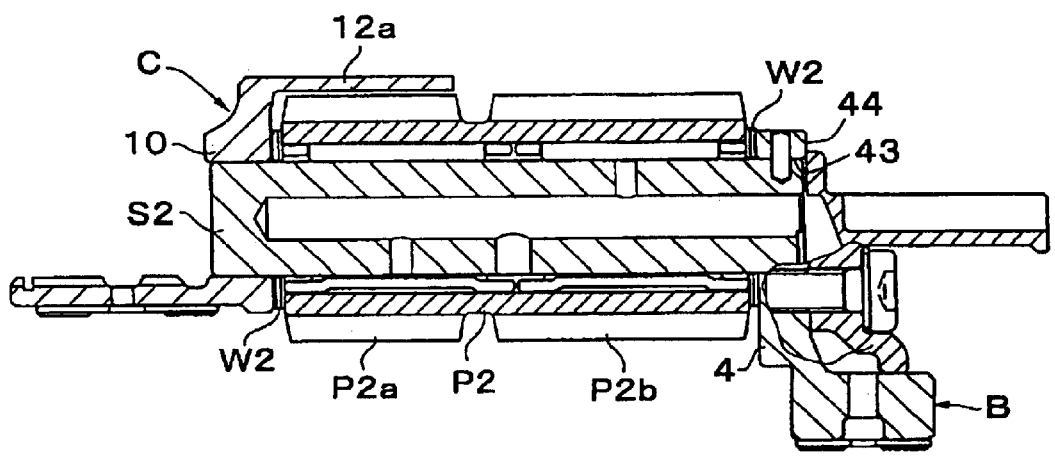
FIGS. 2A and 2B are overall sectional views of the planetary gear set taken in the direction of an axis thereof, wherein the sun gear and the ring gear are excluded.
Figure 2B:
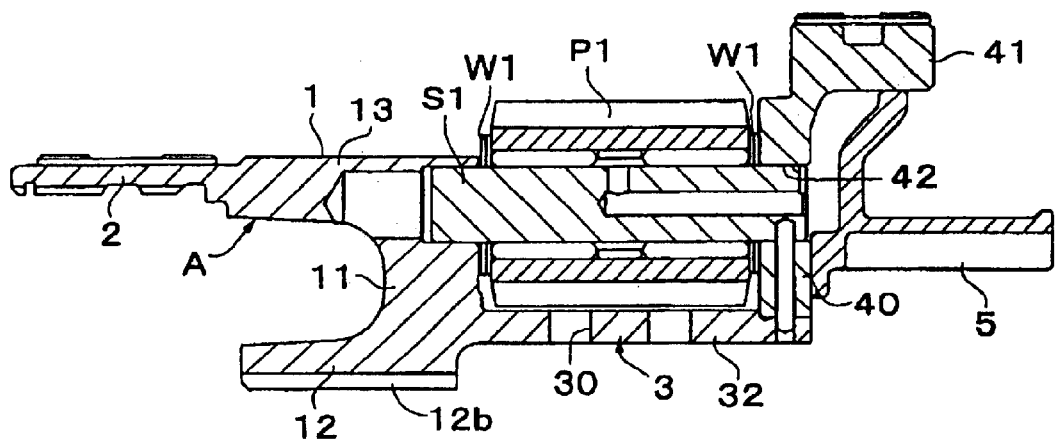

As shown in FIG. 1, which is an elevational view of a carrier with an arrangement of pinions, and FIGS. 2A and 2B, which are overall sectional views taken in the direction of an axis, wherein the sun gear and the ring gear are omitted, the planetary gear set includes a small-diameter sun gear and a large-diameter sun gear that are aligned in the direction of the axis (although not shown) short pinions P1 and long pinions P2 that mesh with each other and form pairs of pinion gears, the short pinions P1 being meshed with the small-diameter sun gear, and the long pinions P2 being meshed with the large-diameter sun gear and having a pinion P2a integrally connected to another pinion P2b that meshes with a ring gear (not shown) and a carrier C supporting these pinions via pinion shafts S1, S2. The carrier C has an annular peripheral wall 12 that extends entirely around outer peripheral portions of the long pinions P2. The annular peripheral wall 12 of the carrier C has thin-wall portions 12a at circumferential-direction positions corresponding to the positions of the long pinions P2. Each thin-wall portion 12a is formed by a recess that is formed in a radially inner side of the annular peripheral wall 12 and extends in a radially outward direction. The annular peripheral wall 12 has, on its outer peripheral surface, a spline arrangement 12b for supporting a friction member (not shown) in a rotation preventing fashion. Splines are absent at the sites of the thin-wall portions 12a. The outside diameter at the thin-wall portions 12a is set at an outside diameter that is equal to the outside diameter at the teeth 12c of the spline arrangement 12b.

The carrier C supports, by means of shafts, inter-meshing gear pairs of the short pinions P1, which are one group of pinions meshing with only the small-diameter sun gear (not shown), and the long pinions P2, which are the other group of pinions meshing with at least the ring gear (not shown). Two end portions (i.e. box structure portion 1 and end portion 4) of the carrier C that support one-side end and the other-side end of the pinions P1, P2 are interconnected by a bridge portion 3 that extends in the direction of the axis. The bridge portion 3 is formed by a column wall portion 31 having a wedge-shaped section which fills a space between the short pinion P1 and the long pinion P2 of adjacent gear pairs, and plate wall portions 32 that extend from the column wall portion through spaces between adjacent long pinions P2, outwardly of the short pinions P1, in the circumferential direction of the carrier.

In this embodiment, the short pinions P1 are provided with a smaller diameter than the long pinions P2, so as to form a space for disposing the bridge portion 3, that is, the plate wall portions 32 in particular, which extend in the circumferential direction of the carrier, outwardly of the short pinions P1. Furthermore, in this embodiment, the supporting axes of the short pinions P1 are positioned inwardly of the supporting axes of the long pinions P2 with respect to the direction of a radius of the carrier C, so that the spaces outward of the short pinions P1 have an increased thickness in radial directions of the carrier C. Accordingly, a sectional area of the column wall portion 31 and a thickness of the plate wall portion 32 are secured.

A further detailed description will be made. In this embodiment, the carrier C is formed by a body A and a cover B as shown in FIGS. 2A and 2B. The body A has the box structure portion 1 that has, at a center thereof, an opening through which a sun gear-connected transfer shaft extends, and that forms end portions which shaft-support one end of each pinion P1, P2, a boss portion 2 that extends outward along the opening of the box structure portion 1 and that forms a support portion of the carrier C to the transfer shaft, and a bridge portion 3 that extends from an outer peripheral side of the box structure portion 1 in an axial direction opposite to the direction of extension of the boss portion 2 and that forms a connecting portion to the cover B. The box structure portion 1 has a box structure in which an outward end wall 10 that shaft-supports an end of each long pinion P2, an inward end wall 11 that supports an end of each short pinion P1, an annular peripheral wall 12 that connects the outward end wall 10 and the inward end wall 11 and that extends in a circumferential direction, and an inner wall 13 that connects edge portions of the two end walls 10, 11 are integrally formed. The bridge portion 3 has a structure in which the bridge portion 3 is integrated with the inward end wall 11 that supports an end of each short pinion P1, and interconnects the end wall 11 and a cover B-side end portion 4 that supports another end of each pinion P1, P2.

Figure 3:
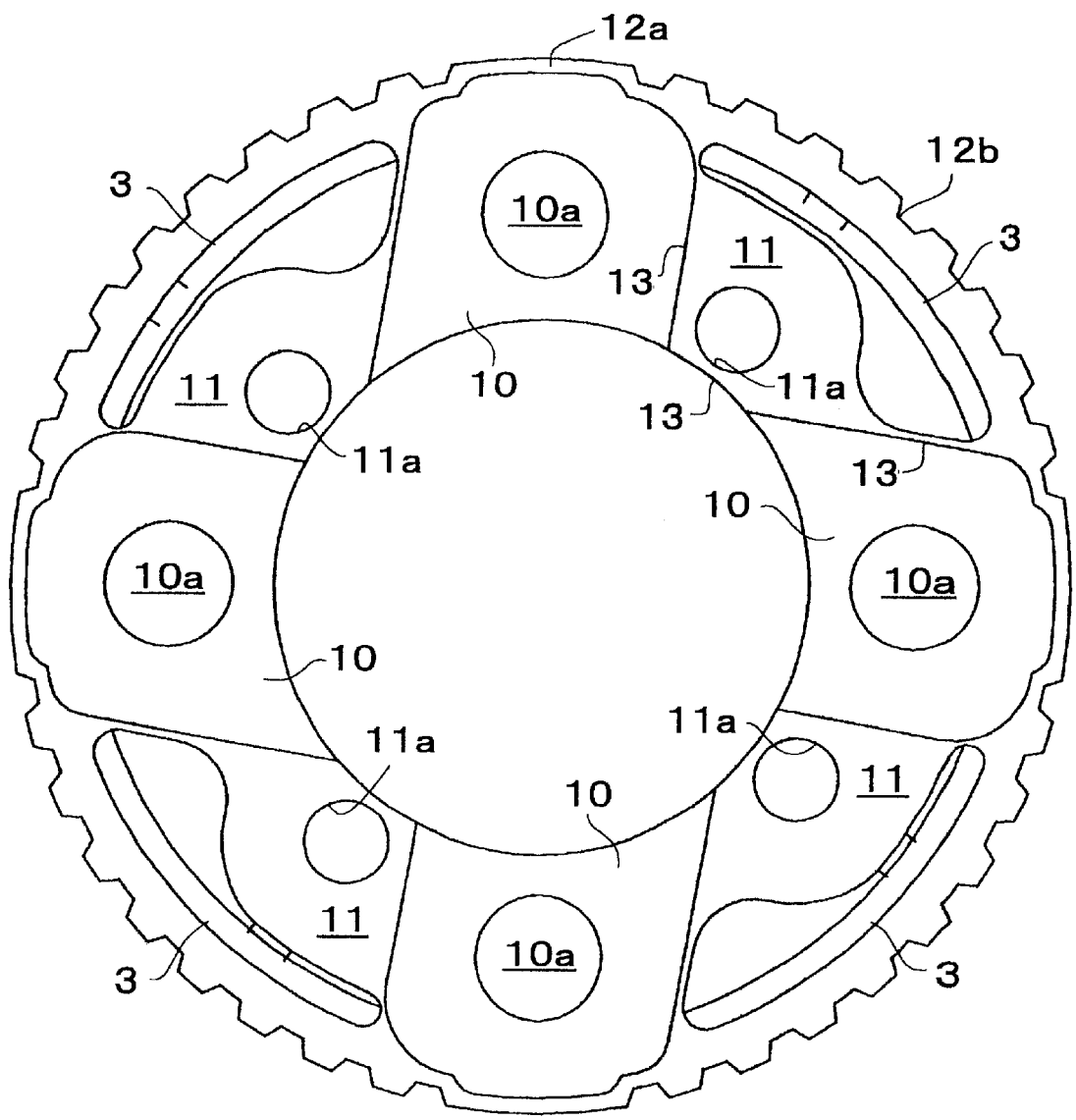
FIG. 3 is an elevational view of only the planetary carrier body.
Figure 4:
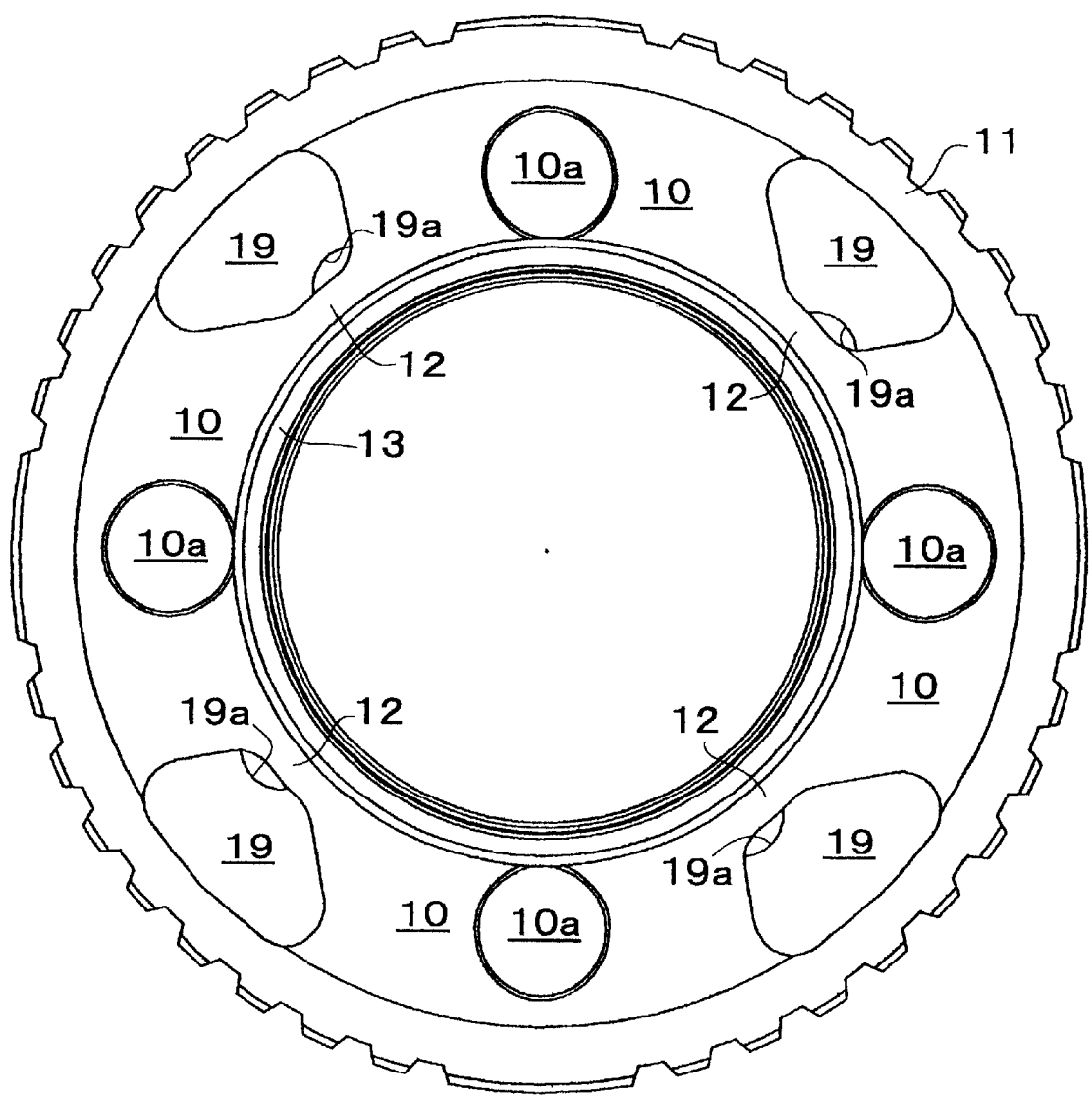
FIG. 4 is a rear-side elevational view of the planetary carrier body.

More specifically, referring to FIG. 3 in which the pinion gear pairs shown in FIG. 1 are omitted, and FIG. 4 showing a rear side view of the body, the box structure portion 1 is provided at positions corresponding to thrust washers W2 (see FIG. 2) impinged on an end surface of each long pinion P2, and therefore is divided into four sections. The box structure portion 1 is made up of end walls 10 that generally form the shape of a cross as a whole in view in the axis direction, end walls 11 which are provided at positions in the direction of axis that are different from the positions of the end walls 10 and that correspond to thrust washers W1 (see FIG. 1) impinged on an end surface of each short pinion P1 between the end walls 10 in a view in the axial direction, and which has a generally sector shape in a view in the axial direction, the annular peripheral wall 12 that extends at an outer peripheral side of the end walls 10, 11 and that continuously extends along the outer periphery of the carrier C, the inner wall 13 that connects two sides of each end wall 10, and two sides and an inner peripheral side of each end wall 11 and that has a generally V shape in a view in the axial direction. A central portion of each end wall 10 has a large-diameter hole 10a for supporting a pinion shaft S2 of each long pinion P2. Each end wall 11 also has a small-diameter hole 1a for supporting a pinion shaft S1 of each short pinion P1.

In this embodiment, in order to use the annular peripheral wall 12 of the box structure portion 1 as a hub of a brake for fixing the carrier C to a transmission case or the like, or a clutch for connecting the carrier C to a speed changing member or the like, an outer peripheral surface of the annular peripheral wall 12 is provided with the spline arrangement 12b for supporting a friction member of a multi-plate brake or a multi-plate clutch. As for the spline arrangement 12b, splines are absent, that is, portions having no spline tooth are formed by avoiding a keyway cutting process, at four sites in the circumferential direction corresponding to the thin-wall portions 12a formed by reducing the wall thickness in accordance with the number of sites of long pinions P2. This process secures a wall thickness of each thin-wall portion 12a in the radial direction which is approximately equal to the height of the spline teeth in a view of the annular peripheral wall 12 from a radially outer side to a radially inner side, in comparison with other portions. Furthermore, the bridge portion 3 is provided with a suitable number of oil discharge holes 30 extending in the bridge portion 3 in radial directions so as to allow good discharge of lubricating oil from the carrier C. Since the carrier body A in this embodiment is formed as a hot-forged article, bias occurs in material density. Therefore, in order to correct the rotational balance in the circumferential direction, sites represented by reference character 11b in FIG. 1 have balance-correcting holes extending in the direction of the axis which are formed with a suitable depth in accordance with the spline tooth pitch utilizing the width of the spline tooth portions of the spline arrangement 12b.

The cover B serves as both a support portion that supports a second end of each pinion P1, P2 via a pinion shaft S1, S2, and a support portion that supports the carrier C onto, for example, a shaft that serves an input shaft of the transmission, and is integrally formed by a plate end wall portion 40 that has a central opening for insertion of a shaft, and a boss portion 41 whose inside diameter is the diameter of the central opening. A portion of the end wall portion 40 of an intermediate diameter between the inside and outside diameters has four small-diameter holes 42 for supporting the pinion shafts S1 of the short pinions P1, and four large-diameter holes 43 for supporting the pinion shafts S2 of the long pinions P2. The diameter is made greater in four peripheral surface portions of the end wall portion 40 positioned radially outward of the large-diameter holes 43 than in other peripheral surface portions. A side of a step between the increased-diameter portions 44 and the other peripheral surface portions serves as a site for positioning the body A and the cover B in the circumferential direction during assembly.

The body A and the cover B constructed as described above are assembled as follows. The step portion of a distal end of the bridge portion 3 of the body A is fitted to an outer periphery of the cover B, thereby accomplishing the positioning in the radial direction. The body A and the cover B are fixed by, for example, tightening bolts in the direction of the axis, and are firmly integrated by welding or the like, if necessary. Thus, the carrier C in which walls are connected as described above is formed. An input member, indicated by reference numeral 5 in FIG. 2, and screwed to an outer end surface of the cover B is an input member to the carrier C. In this embodiment, the input member 5 is in the form of a hub that supports a friction member of a clutch by spline engagement. The input member 5 also serves as an oil passage cover for conducting lubricating oil from the shaft inserted through the carrier C to in-shaft oil passages of the pinion shafts S1, S2.

If a torsional stress occurs in the carrier C having the above-described box structure portion, the bridge portion 3 undergoes substantially no deformation, but undergoes an inclining displacement in a torsional direction relative to the center axis of the carrier, so that the force caused thereby is transferred to the end wall portion 40 and the box structure portion 1 as two end walls. Thus, wave deformation in the directions around the carrier shaft occurs in the plate cover B and the body A. Therefore, if the rigidity of at least one of the end walls is enhanced, the wave deformation of the two end walls can be reduced. In this embodiment, the rigidity of box structure portion 1 as one of the end walls is improved by a reinforcement achieved by a box structure in which the continuity of the annular peripheral wall 12 is maintained by a wall thickness reduction for the purpose of avoiding interference with the long pinion P2. Therefore, the wave deformation is reduced, and the inclination of the bridge portion 3 is reduced. As a result, the wave deformation of the cover B is reduced although maintaining a strength of the cover B is difficult. It should be noted herein that a deformation test on covers B with various plate thicknesses has verified that the effect of changes in the plate thickness on deformation is small.

The planetary gear set of the embodiment constructed as described above can be used for motor power transfer in various forms. For example, if the planetary gear set is used for motive power transfer wherein the carrier C and the two sun gears are suitably used as an input element and a fixed element, and the ring gear is used as an output element, and the input member 5 is connected to a clutch, the annular peripheral wall 12 of the carrier C functions as a hub of a friction member of a brake that is spline-engaged with and is supported onto the annular peripheral wall 12. In this case, friction engagement elements, including the aforementioned friction member, are disposed within a space between the carrier C and a case in which the planetary gear set is housed. Application of the construction of the invention realizes a friction engagement element-supporting structure that does not need a space formed substantially in a radial direction between the inside diameter of the friction engagement elements and the outside diameter of the carrier C. Therefore, a corresponding amount of radial-direction space can be utilized to secure a brake torque capacity due to a diameter-direction expansion of a friction engagement element toward a radially inward side, and to secure a gear transfer torque capacity due to a diameter-direction expansion of the carrier C toward a radially outward side.

Particularly, the construction of the planetary gear set may be applied to a Ravigneaux type planetary gear set of an automatic transmission installed in a vehicle. In a typical Ravigneaux planetary gear set, the diameter of the long pinions meshing with a sun gear tends to be greater than the diameter of the sun gear, in relation to the gear ratio setting, so that it is difficult to secure a circumferential-direction length and an area of a space between pairs of gears through which a bridge portion extends. In contrast, in accordance with the construction of the embodiment in which the invention is applied, a peripheral wall that sufficiently secures a circumferential-direction length and an area of the bridge portion 3 and avoids interference with the long pinions P2 is established, so that a rigidity of the carrier C wherein the long pinions P2 are increased in diameter and number in order to secure a high torque transfer capacity can be maintained.

Thus, according to the planetary carrier structure of the embodiment, the bridge portion 3 is formed by the column wall portion 31 and the plate wall portion 32 by using wedge-shaped spaces between short pinions P1 and long pinions P2 of adjacent pairs of gears, and arc-shaped spaces between the adjacent long pinions P2. Therefore, the torsional strength can be increased, in comparison with the conventional bridge portion formed by only a plate wall portion. Hence, it becomes possible to improve the rigidity of the entire planetary carrier. Therefore, according to this construction, an increased number of gear pairs can be disposed with respect to a fixed outside diameter of the carrier, so as to reduce the torque transfer load per gear pair. Thus, the durability of the planetary gear set can be improved.

Furthermore, the short pinions P1 have a smaller diameter than the long pinions P2, and spaces are formed outward of the reduced-diameter short pinions P1, and the bridge portions 3 are disposed in the spaces. In this manner, it is possible to construct bridge portions 3 that are long in the circumferential-direction length, which is similar to a single-pinion construction, and that fully use the spaces between the adjacent long pinions P2. Therefore, the torsional strength can be increased, so that the rigidity of the entire planetary carrier can be improved. Furthermore, according to this construction, the aforementioned rigidity improvement is achieved by reducing the diameter of the short pinion P1 of each gear pair, that is, the pinion meshing with only the sun gear. Therefore, it is possible to improve the rigidity of the planetary carrier without affecting the gear ratio determined by the gear diameter of the long pinions P2 meshed with the ring gear.

Figure 5A:
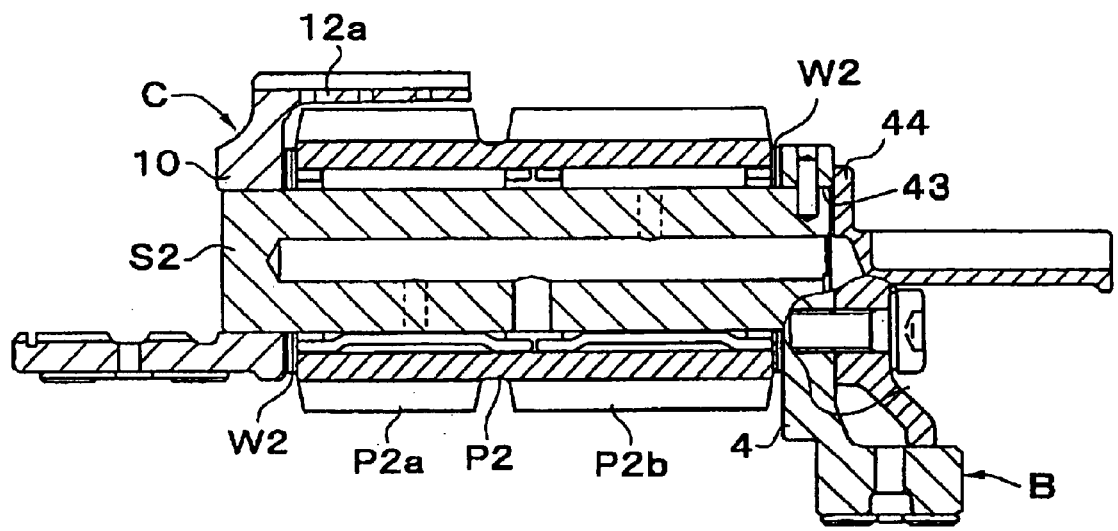
FIGS. 5A and 5B are overall sectional views of a planetary gear set in accordance with a second embodiment of the invention, taken in the direction of an axis thereof, wherein the sun gear and the ring gear are excluded.
Figure 5B:
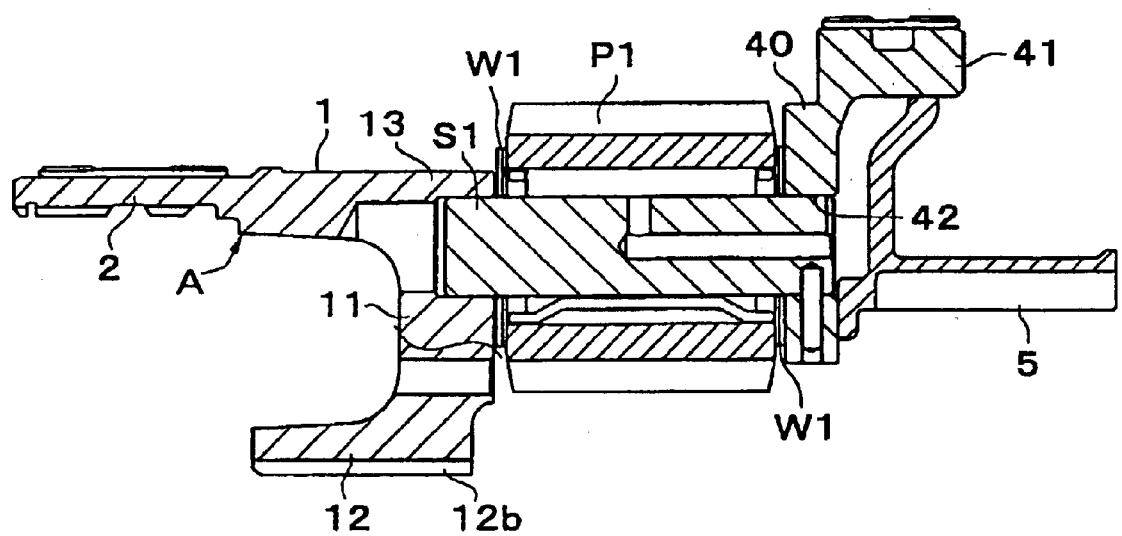

Next, FIGS. 5A and 5B shows a second embodiment in which a construction for reducing the wall thickness of an annular peripheral wall as in the first embodiment is applied to a similar Ravigneaux type planetary gear set having three pairs of pinion gears. In this embodiment, the tooth-absent structure of the first embodiment is not applied. Other constructions are substantially the same as those of the first embodiment. Therefore, comparable members are represented by comparable reference characters, and will not be described again. The upper and lower axial-direction sections in FIGS. 5A and 5B are sections taken on planes in which pinion shafts S1, S2 extend, and therefore, the bridge portion of the carrier C is not shown. In this embodiment, circumferential spaces between the pinion gear pairs are larger than the circumferential spaces in the foregoing embodiment, so that a bridge portion is formed in such a fashion that the bridge portion extends between the long pinions P2 and the short pinions P1 of adjacent pairs of pinion gears. In the case where this construction is adopted, too, the box structure of the carrier C is accomplished, and durability based on the securing of a torsional rigidity is achieved.

The invention has been illustrated above in the forms in which the invention is applied to Ravigneaux type planetary gear sets and, more particularly, to planetary gear sets in which portions of each long pinion meshing with a short pinion and the large-diameter sun gear has equal diameters because the application thereof to the above-described planetary gear set is particularly effective. However, the invention is also applicable to a planetary gear set in which the long pinions are stepped pinions wherein the aforementioned meshing portions have different diameters. Furthermore, the invention is widely applicable to other types of planetary gear sets, such as double-pinion type planetary gear sets, and the like.

What is claimed is:

1. A planetary gear set, comprising:
   a plurality of pinions meshing with a sun gear; and
   a carrier that shaft-supports the pinions, wherein the carrier has an annular peripheral wall that extends entirely around outer peripheries of the plurality of pinions the annular peripheral wall has thin-wall portions formed by recesses in a radially inner side, at a circumferential-direction position corresponding to positions of the pinions and the annular peripheral wall has, on an outer periphery thereof, a spline for supporting a friction member in a rotation stopping fashion and teeth which are absent in the thin-wall portions, with an outside diameter of the thin-wall portions equal to an outside diameter of the teeth.

2. The planetary gear set according to claim 1, wherein the plurality of pinions are connected to other pinions that mesh with at least a ring gear.

3. The planetary gear set according to claim 2, wherein the plurality of pinions and the other pinions are long pinions of a Ravigneaux type planetary gear set.

4. The planetary gear set according to claim 3, wherein the long pinions are stepped and the plurality of pinions have a smaller diameter than the other pinions.

5. A planetary carrier, comprising:
   shaft supported intermeshing gear pairs with a first pinion that meshes with only a sun gear, and a second pinion that meshes with at least a ring gear; and
   two end portions that shaft-support a first end and a second end of each pinion that are connected by a bridge portion that extends in a direction of an axis, wherein the bridge portion has a column wall portion that fills a space between the first pinion of a first gear pair and the second pinion of a second gear pair, and a plate wall portion that extends from the column wall portion in a direction of a circumference of the carrier, and within a space between the second pinion of the first gear pair and the second pinion of the second gear pair, and outwardly of the first pinion of the first gear pair.

6. The planetary carrier according to claim 5, wherein a supporting axis of the first pinion is positioned inward of a supporting axis of the second pinion in the direction of the circumference of the carrier.

7. The planetary carrier according to claim 6, wherein the gear pairs are long pinions and short pinions of a Ravigneaux type planetary gear set.

8. The planetary carrier according to claim 7, wherein the end wall that shaft-supports an end of each pinion is a box structure wall in which an end wall that shaft-supports an end of a short pinion and an end wall that shaft-supports an end of a long pinion are connected by an axis-direction wall that continuously extends in a circumferential direction, and the bridge portion connects the end wall that shaft-supports the end of the short pinion and an end wall that shaft-supports another end of each pinion.

9. The planetary carrier according to claim 6, wherein the gear pairs are pinions of a double-pinion type planetary gear set.

10. A planetary carrier, comprising:
shaft supported intermeshing gear pairs of a first pinion that meshes with only a sun gear, and a second pinion that meshes with at least a ring gear;
two end portions that shaft-support one end and another end of each pinion are connected by a bridge portion that extends in a direction of an axis, wherein the first pinion has a smaller diameter than the second pinion, and the bridge portion is formed by a wall that extends in a direction of a circumference of the carrier, within a space between the second pinion of the first gear pair and the second pinion of the second sear pair and outwardly of the first pinion of the first gear pair.

11. The planetary carrier according to claim 10, wherein a supporting axis of the first pinion is positioned inward of a supporting axis of the second pinion in the direction of the circumference of the carrier.

12. The planetary carrier according to claim 11, wherein the gear pairs are long pinions and short pinions of a Ravigneaux type planetary gear set.

13. The planetary carrier according to claim 12, wherein the end wall that shaft-supports an end of each pinion is a box structure wall in which an end wall that shaft-supports an end of a short pinion and an end wall that shaft-supports an end of a long pinion are connected by an axis-direction wall that continuously extends in a circumferential direction, and the bridge portion connects the end wall that shaft-supports the end of the short pinion and an end wall that shaft-supports another end of each pinion.

14. The planetary carrier according to claim 11, wherein the gear pairs are pinions of a double-pinion type planetary gear set.

* * * * *